G. T. STRITE.
TRACTION MACHINE.
APPLICATION FILED AUG. 4, 1916. RENEWED FEB. 27, 1920.

1,393,462.

Patented Oct. 11, 1921.

2 SHEETS—SHEET 1.

WITNESSES
M. R. McInnis
E. A. Paul

INVENTOR
GEORGE T. STRITE
BY Paul & Paul
ATTORNEYS

G. T. STRITE.
TRACTION MACHINE.
APPLICATION FILED AUG. 4, 1916. RENEWED FEB. 27, 1920.

1,393,462.

Patented Oct. 11, 1921.
2 SHEETS—SHEET 2.

WITNESSES

INVENTOR
GEORGE T. STRITE
BY Paul & Paul
ATTORNEYS

UNITED STATES PATENT OFFICE.

GEORGE T. STRITE, OF MINNEAPOLIS, MINNESOTA.

TRACTION-MACHINE.

1,393,462. Specification of Letters Patent. Patented Oct. 11, 1921.

Application filed August 4, 1916, Serial No. 113,112. Renewed February 27, 1920. Serial No. 361,720.

*To all whom it may concern:*

Be it known that I, GEORGE T. STRITE, a citizen of the United States, resident of Minneapolis, county of Hennepin, State of Minnesota, have invented certain new and useful Improvements in Traction-Machines, of which the following is a specification.

My invention relates to a machine known as a "garden tractor" and is designed as an attachment and improvement to the machine of this type shown and described in Letters Patent of the United States, issued October 30, 1917, No. 1,245,121, to Beeman Garden Tractor Company, assignee of Cornelius A. Peters.

In the machine set forth in this patent, a source of motive power and internal combustion engine are carried upon two traction wheels, to the frame of which source of motive power cultivators are attached in the rear and a guiding post is provided for swinging the cultivators from side to side and for rocking the machine and the carrying wheels on a vertical axis to guide it between the rows of plants. Obviously, it is essential in a device of this character used for cultivating the soil around tender plants and destroying the weeds between the rows that the operator have immediate and perfect control of the machine. It is also desirable that the power be under such control that the operator can start the machine without jump or jerk and in turning can make provision for the travel of one wheel a greater distance than the other.

With this end in view my invention consists generally in a differential friction clutch device disposed between the crank shaft of the carrying wheels and provided with a controlling device by means of which the operator can easily and smoothly start the machine and regulate the travel of the wheels in turning.

Figure 1:
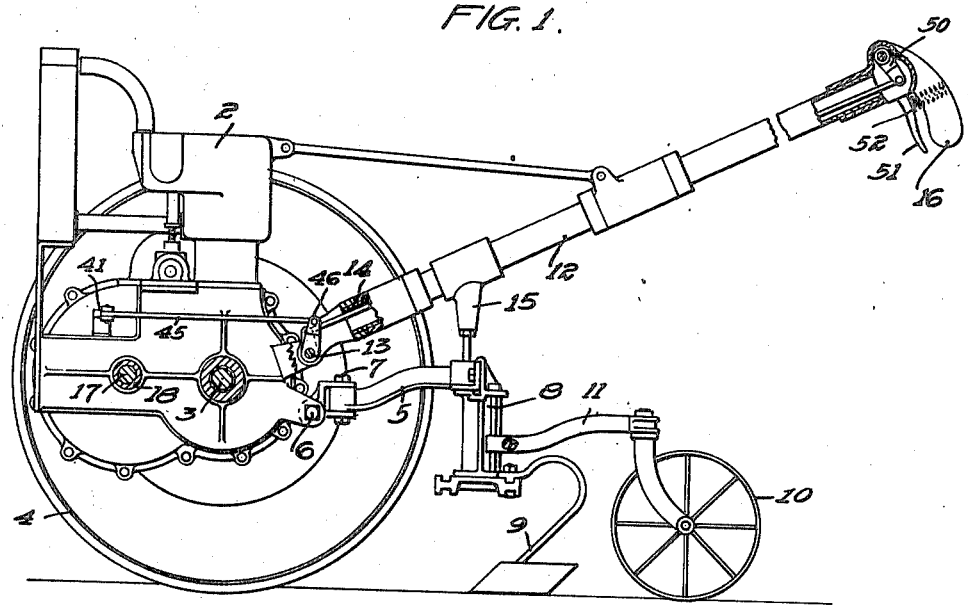
Figure 2:
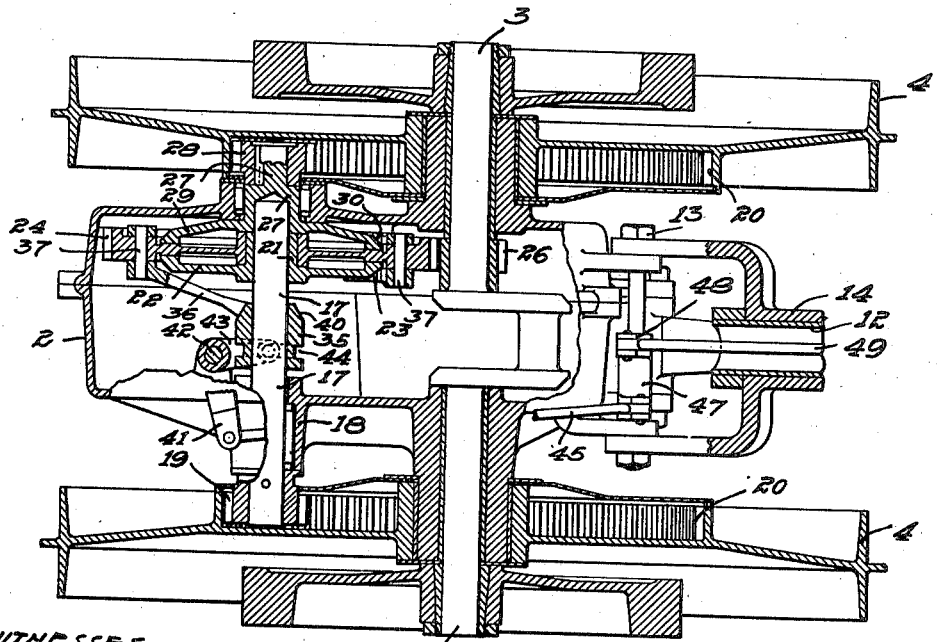
Figure 3:
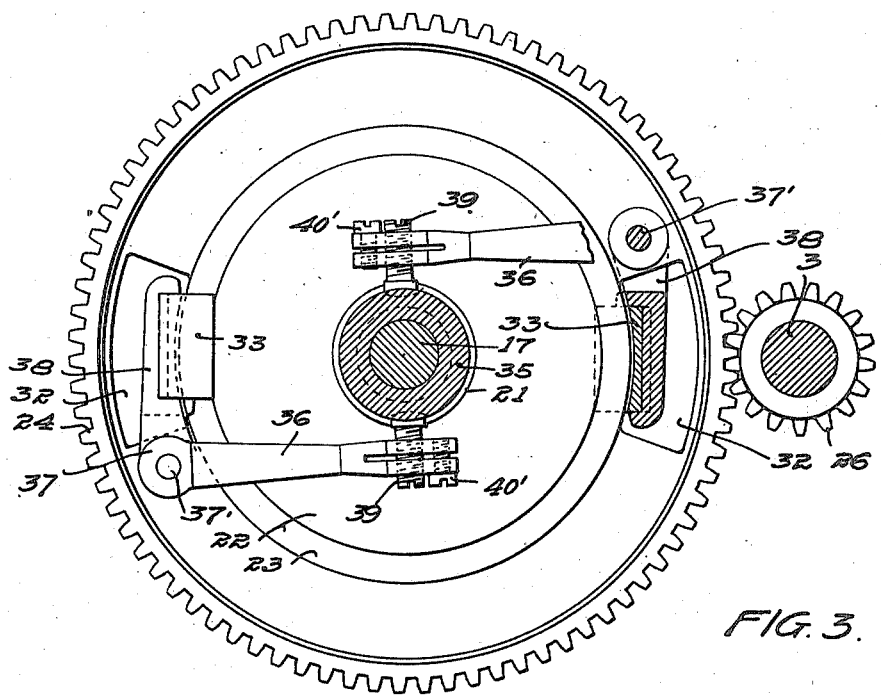
Figure 4:
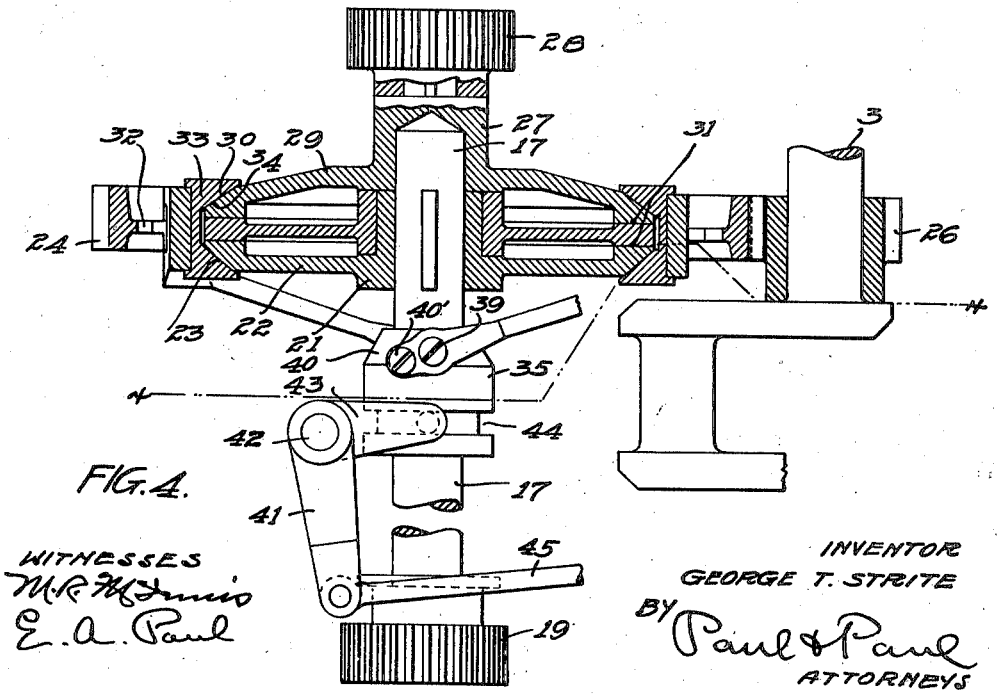

In the accompanying drawings forming part of this specification,

Figure 1 is a vertical sectional view through a traction machine embodying my invention, Fig. 2 is a horizontal sectional view of the same, Fig. 3 is a vertical sectional view through the friction clutch differential, on the section line *x—x* of Fig. 4, Fig. 4 is a horizontal sectional view of the same, showing the driving connection with the axle.

In the drawing, 2 represents the source of motive power, consisting preferably of a single cylinder internal combustion engine having its crank case extended to form bearings for a crank shaft 3, traction wheels 4 being mounted on the extensions of the crank case, concentric with the crank shaft. The engine is disposed above the shaft and connected therewith in the usual way. A draft bar 5 has a horizontal pivotal connection 6 with the frame of the engine for vertical oscillation and also has a vertical pivot 7 for horizontal oscillation. A carrier 8 is mounted on the draft bar and cultivators 9 are mounted on the carrier for transverse adjustment. A caster wheel 10 is provided in the rear of the cultivators and connected with the carrier by an arm 11. A steering post 12 has a horizontal pivot at 13 on the machine for vertical oscillation and is mounted at 14 for rotary movement independent of its vertical oscillation, and said post has a depending arm 15 that is pivotally connected with the draft bar 5 for swinging it on its vertical pivot when the post is rocked on its longitudinal axis. Suitable handle bars 16 are provided at the rear end of the post, all as substantially set forth in the Peters patent above referred to.

For driving the traction wheels from the crank axle I prefer to employ the following described mechanism. 17 is a shaft, mounted in bearings in a suitable housing 18 and having a pinion 19 on one end thereof for meshing with an internal gear 20 of one of the traction wheels 4.

A hub 21 is keyed on this shaft and has a flange 22 provided with a beveled friction surface 23. A gear 24 has a hub loosely mounted on the hub 21 and free to revolve thereon, said gear meshing with a pinion 26 that is secured on the crank shaft 3. A hub 27 is loosely mounted on the end of the shaft 17 and has a pinion 28 thereon for meshing with the internal gear of the other traction wheel, which corresponds to the one described and which I will designate by the same reference numeral. This hub 27 has a flange 29 provided with a beveled friction surface 30 on the opposite side of the gear 24 from the flange 22 and the friction surface 23, said gear having flat contacting surfaces 31 between the flanges 22 and 29. The gear 24 is also provided with openings 32 therein to receive shoes 33 which have converging friction surfaces 34 to fit the surfaces 23 and 30 of the clutch members 22 and 29. The effect of this engagement of the shoes with the friction surface of the clutch members is to press them toward one another against the surfaces 31 of the gear wheel and thereby temporarily clamp these clutch members and the gear wheel together. The parts are so mounted that there is sufficient clearance between the gear wheel and the clutch members to allow the gear to run idle when desired, but as soon as the shoes are operated to press the clutch members against the gear, the power will be transmitted through the gear to the pinions for driving the traction wheels. These pinions, as will be clear from the foregoing description, are mounted independently of one another, one on the shaft 17 and the other on the hub 27 that is loosely mounted on the shaft. Both pinions will be locked to become positive drives when the clutch shoes are operated and by loosening the clutch member one pinion may turn independently of the other, the position of the shoes permitting the traction wheels to move independently and compensate for the difference in travel of these wheels in turning the machine. A clutch drive of this kind is extremely sensitive, is easily controlled and through the proper operating mechanism which I will presently describe, can be so easily and accurately shifted that it is possible to start and stop the machine without the slightest jerk or shock.

For operating the shoes I prefer to provide a collar 35 mounted to slide on the shaft 17. Arms 38 of a bell crank 37 are mounted on pins 37' journaled in the gear 24 and arms 38 of said bell crank carry the friction shoes 33, heretofore described. The arms 36 are split at one end and provided with screws 39 having heads to bear on the beveled end 40 of the collar 35, said screws being adjustable in said arms and held therein against premature movement by means of locking screws 40'. Movement of the collar 35 back and forth on the shaft 17 will adjust the shoes in their locking position or release them. For moving this collar I prefer to provide an arm 41 pivoted at 42 on the crank case and having an arm 43 to engage with the walls of an annular groove 44 in said collar. A rod 45 is connected to the arm 41 and to an arm 46 on a hub 47 that is loosely mounted on the pivot pins 13. A similar arm 48 on the hub 47 is connected by a rod 49 arranged preferably within the hollow post 12 to an arm 50 mounted in the handle bars and having a lever 51 in position to be grasped by the person guiding the machine for rocking the arm 41 and shifting the collar 35 to lock or release the friction shoes. A spring 52 is arranged to normally hold the lever 51 in its releasing position, provision being made for throwing the arm 50 past the center to hold the friction shoes in their locking position so that the operator of the machine is not obliged at all times to maintain a handgrip on the lever 51 while the machine is running. With this device the operator of the machine has complete control of it at all times. He can start the engine and with a very slight movement of the lever 51 can set the clutch to lock the members of the gear and transmit power to both of the driving wheels, and this will be done so easily and smoothly that the machine will start without any jump or jerk. A slight pressure on the lever 51 will be sufficient to start the machine slowly, the gear slipping slightly between the shoes. By increasing the pressure on the lever 51 the shoes will grip the gear more firmly, so there will be less slippage and the speed of the machine will be increased. When it is desired to turn the machine by slightly reducing the force of the grip of the friction shoes, one member of the clutch may slip to compensate for the difference in travel of the traction wheels.

I claim as my invention:

1. A traction machine comprising a frame, a source of motive power thereon, traction means for said frame, a crank shaft operated from said source of motive power, a gear having a driving connection with said crank shaft and provided with friction surfaces, clutch members having independent driving connections with said traction means and mounted to engage said friction surfaces respectively for driving said means from said gear, and mechanism for operating said clutch members.

2. A traction machine comprising a frame, a source of motive power mounted therein, a crank shaft journaled in said frame, a pinion on said crank shaft, carrying and traction wheels for said frame, a shaft journaled in said frame parallel with said crank shaft, a pinion mounted on said parallel shaft and having a driving connection with one of said wheels, a clutch member splined on said shaft, a second clutch member loosely mounted on said shaft and having a driving connection with the other traction wheel, a gear having friction surfaces between said clutch members and meshing with said crank shaft pinion, and mechanism for moving said clutch members into engagement with said friction surfaces or releasing the same.

3. The combination, with a frame, of a crank shaft mounted therein, a source of motive power for said crank shaft, traction and carrying wheels for said frame at the ends of said crank shaft, a counter shaft geared to said crank shaft and having driving connections with said wheels, the gear connecting said counter shaft with said crank shaft having friction surfaces thereon and clutch members mounted on said counter shaft for engagement with said friction surfaces, and shoes mounted to engage said clutch members and clamp them upon said friction surfaces.

4. A traction machine comprising a frame, a source of motive power thereon, traction wheels for said frame, a crank shaft concentric with said wheels, a pinion mounted on said crank shaft, a loosely mounted gear meshing with said pinion, clutch members having independent gear connections with said traction wheel, and means for adjusting said clutch members to engage or release said gear.

5. A traction machine comprising a frame, a source of motive power thereon, traction wheels for said frame, a crank shaft operated from said source of motive power, a gear having a driving connection with said crank shaft and provided with opposing friction surfaces, clutch members having independent driving connections with said traction wheels and mounted to engage said friction surfaces respectively for driving said wheels from said gear, shoes for operating said clutch members, and mechanism for shifting said shoes to an engaging or releasing position.

6. A traction machine comprising a frame, a source of motive power thereon, traction wheels for said frame, a crank shaft operated from said source of motive power, a pinion secured on said crank shaft, a loosely mounted transmission gear normally meshing with said pinion to be driven thereby, a counter shaft concentric with said gear, clutch members mounted on said counter shaft upon opposite sides of said transmission gear and having independent driving connections with said wheels and coöperating with said gear to form a differential, and means for clamping said clutch members and said gear together to drive said traction wheels.

7. A traction machine comprising a frame, a source of motive power thereon, traction wheels for said frame, a crank shaft operated from said source of motive power, a pinion on said crank shaft, a counter shaft, a pinion secured thereon having a driving connection with one of said traction wheels, a second pinion having a driving connection with the other traction wheel, a loosely mounted transmission gear normally meshing with said crank shaft pinion to be driven thereby, transmission members for engaging said transmission gear, one of said transmission members being connected with said second pinion, said transmission members and gear and associated parts forming a differential when said transmission members are in release position, and means for engaging said transmission members with said transmission gear to drive said traction wheel pinions.

8. A traction machine comprising a frame, a source of motive power thereon, traction wheels for said frame, a crank shaft operated from said source of motive power, a pinion secured on said crank shaft, a loosely mounted transmission gear normally meshing with said pinion to be driven thereby, a counter shaft, and clutch members mounted on said counter shaft upon opposite sides of said transmission gear and having independent driving connection with said wheels and coöperating with said gear to form a differential, and means for operating said clutch members from said gear to drive both said traction wheels.

9. The combination, with a frame, of a crank shaft mounted therein and provided with a driving pinion, a source of motive power for said crank shaft, traction and carrying wheels for said frame provided with interior gear rings, a countershaft having a pinion meshing with the gear ring of one of said wheels, a disk secured on said counter shaft, a gear loosely mounted on said countershaft and meshing with the driving pinion, a disk loosely mounted on said countershaft and meshing with the pinion of the other traction wheel, and means for clamping said disks and countershaft gear together.

In witness whereof I have hereunto set my hand this 24th day of June, 1916.

GEORGE T. STRITE.

Witnesses:
 E. R. BEEMAN,
 A. C. SURLER.